United States Patent [19]  
Matsumoto et al.

[11] Patent Number: 4,880,207
[45] Date of Patent: Nov. 14, 1989

[54] INTAKE THROTTLE VALVE RETURN DEVICE OF ENGINE

[75] Inventors: Osamu Matsumoto; Mamoru Sumida; Hirokazu Maehara, all of Hyogo, Japan

[73] Assignee: Mitsubishi Denki Kabushiki Kaisha, Tokyo, Japan

[21] Appl. No.: 314,353

[22] PCT Filed: Mar. 1, 1988

[86] PCT No.: PCT/JP88/00227
§ 371 Date: Oct. 13, 1988
§ 102(e) Date: Oct. 13, 1988

[87] PCT Pub. No.: WO88/06682
PCT Pub. Date: Sep. 7, 1988

[30] Foreign Application Priority Data

Mar. 2, 1987 [JP] Japan .................. 62-47025
Mar. 2, 1987 [JP] Japan .................. 62-47026
Mar. 2, 1987 [JP] Japan .................. 62-472027
Mar. 2, 1987 [JP] Japan .................. 62-47028
Mar. 2, 1987 [JP] Japan .................. 62-47029

[51] Int. Cl.4 .................................................. F16K 1/22
[52] U.S. Cl. ...................................... 251/337; 251/305; 267/155
[58] Field of Search ................ 251/305, 337; 267/155

[56] References Cited
U.S. PATENT DOCUMENTS

Re. 22,030  2/1942  Boller ................... 251/305
3,395,727  8/1968  Weise et al. .......... 251/305

FOREIGN PATENT DOCUMENTS 46345  3/1984  Japan .
46346  3/1984  Japan .
47827  3/1985  Japan .
57751  4/1985  Japan .
195939  11/1985  Japan .

Primary Examiner—A. Michael Chambers
Attorney, Agent, or Firm—Sughrue, Mion, Zinn, Macpeak and Seas

[57] ABSTRACT

A cup-shaped spring holder having a flange on the outer periphery on the open end side is secured on the end portion of a valve shaft which protrudes outwardly from a carburetor barrel, with a clearance for coil insertion provided between the barrel and the open-end side. An outer torsion coil spring is fitted in the aforementioned spring holder to restrain an axial shift of the spring. And one end of an inner torsion coil spring fitted on the aforementioned shaft end portion is led out through the aforementioned clearance and retained by a spring retainer on the aforesaid barrel. Because of the above-described constitution, this invention features simple construction, easy manufacture, increased mechanical strength, a less number of components parts required, easy assembly, and improved valve shaft strength.

10 Claims, 5 Drawing Sheets

FIG.5
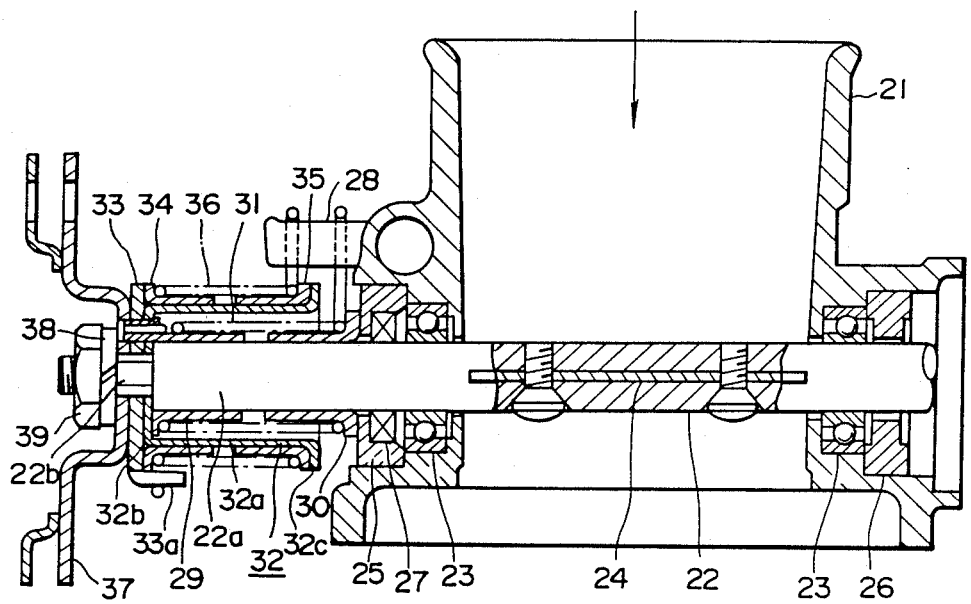
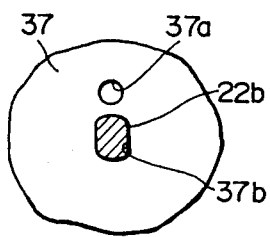
FIG.6A
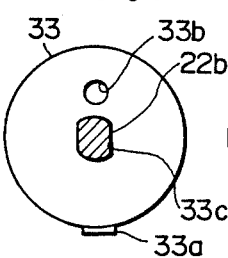
FIG.6B
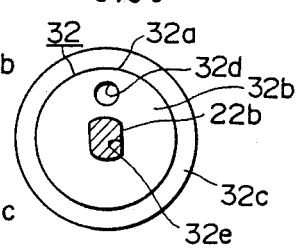
FIG.6C

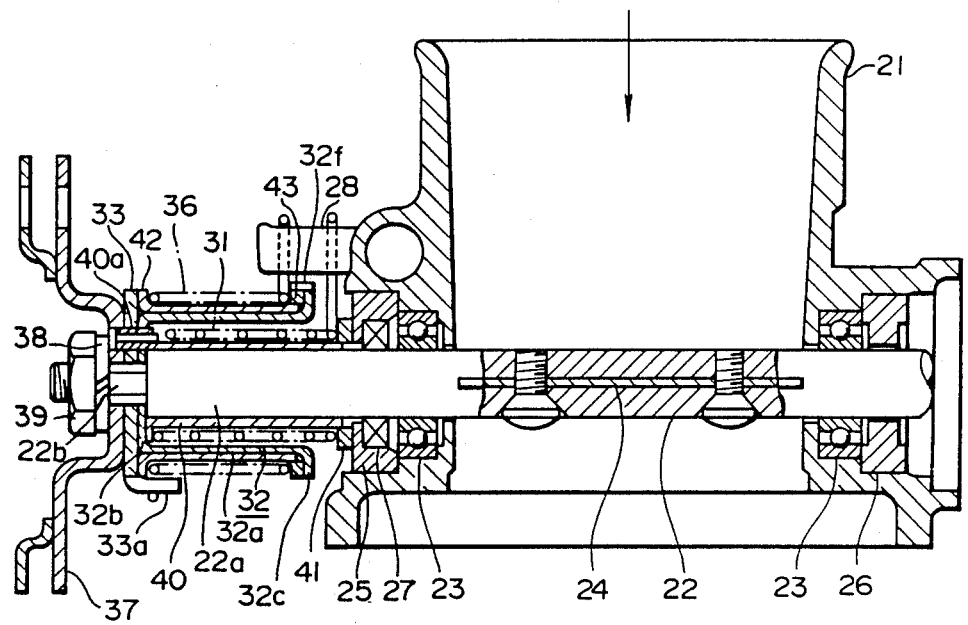
FIG.11
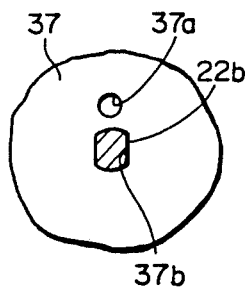
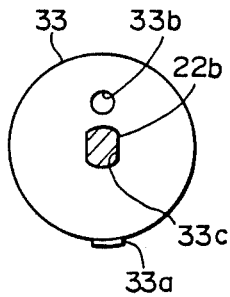
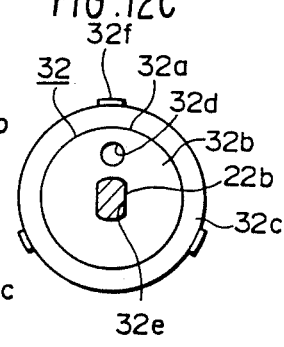
FIG.12A  FIG.12B  FIG.12C

INTAKE THROTTLE VALVE RETURN DEVICE OF ENGINE

BACKGROUND OF THE INVENTION

Field of the Invention

The present invention relates to an intake throttle valve return device of engine that is to be used in a fuel injector or a carburetor.

FIG. 1 is a longitudinal sectional view showing a prior-art intake throttle valve return device disclosed in for example Laid-Open Japanese Patent No. Sho 59-46345. In this drawing, numeral 1 denotes a carburetor body, and numeral 2 is a throttle valve securely fixed on a valve shaft 3. Numeral 4 designates a supporting arm fixed on the carburetor body 1, and numeral 5 is a bowl-shaped collar holder inserted and locked to support on the valve shaft 3, and is provided with a flange section 6. Numerals 7, 8 are cylindrical collars with a flange to receive an outer torsion spring 9; numerals 10, 11 are cylindrical collars having a flange for receiving the ends of an inner torsion spring 12; and numerals 13, 14 are cylindrical sleeves which are inserted and locked to support respectively on the valve shaft 3, and interposed between the above-mentioned cylindrical collars 7, 10 and between he cylindrical collars 8, 11, thereby preventing contact and interference between the aforementioned torsion springs 9, 12. Numeral 15 is a lock pin fixedly installed to the aforementioned carburetor body 1 for retaining the ends of torsion springs, and numeral 16 designates a throttle valve lever connected to the end of the valve shaft.

Either of the other end of the aforementioned torsion spring 9 and the other end of the torsion spring 12 inserted into the cylindrical sleeve 14 are locked at engaging portions 17, 17 formed on the above-mentioned throttle valve lever 16, and each one end is also locked on the above-described pin 15. Thus both the torsion springs 9 and 12 are wound around, and twisted into, the valve shaft 3 so that a spring force will act in the direction where the throttle valve 2 will be closed.

The above-mentioned bowl-shaped collar holder 5, as shown in the plane view of FIG. 2 and the side view of FIG. 3, has cutout ends 5a, 5b formed to hold the cutout section throughout the range of angle $\alpha$ corresponding to the angle of rotation of the valve shaft 3, and from this cutout section, one end of the inner torsion spring 12 is led outwardly, being locked on the pin 15.

The above-mentioned cylindrical sleeve 13 also, as shown in the sectional view of FIG. 4, are provided with cutout ends 13a and 13b formed to hold the cutout section throughout the range of angle corresponding to the angle of rotation of the valve shaft 3, and from this cutout section one end of the inner torsion spring 12 is led outwardly.

The valve shaft 3 described above, as shown in FIG. 4, has a cutout locking section 3a formed in parallel with the outer periphery, ranging from the supporting arm 4 portion to the shaft end, and the bowl-shaped collar holder 5 and the cylindrical sleeve 13 are provided with engaging holes 5c and 13c respectively which are formed to be engaged with this cutout locking section 3a.

The prior-art intake throttle valve return device, however, has the following problems.

(1) The bowl-shaped collar holder 5 and the cylindrical sleeve 13 have a wide cutout section so formed as to lead out one end of the inner torsion spring 12, resulting in a decrease in mechanical strength and difficulty in manufacture.

(2) Multiplication of parts are required.

(3) The valve shaft 3 has the cutout engaging section 3a formed from the supporting arm 4 position to the shaft end, resulting in decreased mechanical strength. To compensate for it, the shaft diameter has to be increased.

(4) Other ends of the torsion springs 9, 12 are led out in an axial direction and further bent in the circumferential direction. The cylindrical collar 11, the cylindrical sleeve 14 and the throttle valve lever 16 are provided with a circumferential long hole through which the end of the springs is inserted, on account of which, however, the mechanical strength of these parts is low.

(5) In assembling work, since the cylindrical sleeve 14 and the throttle valve lever 16 are fitted by the engaging section 17 to the other ends of the twisted torsion springs 9, 12 that have been led out, it is difficult to adjust the position in a circumferential direction of both for fitting them in the cutout engaging section at the end portion of the valve shaft 3 and accordingly to accomplish the assembling work.

(6) Other ends of the torsion spring 9, 12 are directly metallic-contacted with the engaging section of the cylindrical sleeve 14 and the throttle valve lever 16, and therefore it is likely that wear will occur due to abrasion resulting from displacement between both sides.

(7) The engaging section of the cylindrical collar 11, cylindrical sleeve 14 and throttle valve lever 16 for holding the other ends of the torsion springs 9, 12 has a long hole; in the assembling work, therefore, it is not easy to position and assemble the torsion springs 9, 12 in a twisted state.

(8) The flanged cylindrical collars 10, 11 which receive the torsion spring 12 is divided to both sides, and accordingly the torsion spring 12 is likely to move in a radial direction, and a part of the torsion spring 12 will bite in between both the cylinders, thereby interfering with operation.

SUMMARY OF THE INVENTION

The present invention has been accomplished in an attempt to solve the aforementioned problems, and has for its object to prevent decreasing mechanical strength and valve shaft strength by diminishing the quantity of component parts and outwardly installing one end of the inner torsion coil spring through the unnecessary cutout section of the component parts and facilitated manufacture.

It is a further object to facilitate the positioning and assembling of an engaging member in engagement with the other end of the torsion coil spring extended in the axial direction and the spring holder, and to prevent wear of the other end installed in the axial direction of the torsion coil spring and each engaging hole of the spring holder and the engaging member.

It is a further object to facilitate the assembly of component parts such as an engaging member which does not require bending the end of the other end extended axially of the inner torsion coil spring, and can be simply and exactly installed.

It is a further object to diminish the eccentricity of the torsion coil spring by preventing the outer torsion coil spring from bitting into the flanged cylindrical collar, and by positioning the other end of the cylindrical sleeve concentrically with the valve shaft.

The intake throttle valve return device of engine of the present invention is of such a constitution that a spring holder comprising a bottomed cylindrical section and provided with a flange section at the other end is inserted at a bottom section and fixed on the end portion of a valve shaft; furthermore, an engaging member is inserted and fixed on the end portion of the valve shaft; an inner torsion coil spring is disposed between the shaft end portion of the valve shaft and the spring holder; an outer torsion coil spring is disposed on the outer periphery of the spring holder and its axial movement is restricted by the flange section; each other end of both the torsion coil springs is retained by the engaging member; and each one end is attached to a spring holder of a barrel; therefore the spring holder requires no cutout. Since this spring holder is secured at the bottom on the end portion of the valve shaft, the provision of a cutout section only at the end portion suffices.

Furthermore, a flanged cylindrical sleeve produced from a wear-resistant synthetic resin material is fitted on the shaft end portion of the valve shaft. This cylindrical sleeve is provided as a unit, at the flange section, with a tube-like engaging projection protruding in the axial direction out to the flange section, and engaged in each engaging hole in the bottom of the spring holder and the engaging member, with the other axially extended end of the inner torsion coil spring being in engagement with the inside of the aforementioned tube-like engaging projection. Therefore, the spring holder and the engaging member can readily be assembled, thereby preventing wear of the spring holder and the engaging member corresponding to the other axially extended end of the torsion coil spring.

Furthermore, the other end of the aforementioned torsion coil spring is designed to be long enough to insure spring mounting in the event that the height of the coil spring has decreased to a minimum by an external force such as vibration. That is, a proper spring mounting function is maintained.

The wear-resistant flanged cylindrical sleeve receives the inside-diameter side through the entire length of the inner torsion coil spring and its other side in the axial direction, a wear-resistant annular collar installed on the outer periphery of the end portion of the cylindrical sleeve receives the other side of the above-mentioned spring, this annular collar being received on the barrel side; and the positioning engaging section provided on the barrel side determines the position of the spring in the radial direction, thereby preventing the inner torsion coil spring from biting into the cylindrical sleeve, reducing the eccentricity of the torsion coil spring, and protecting the cylindrical sleeve from fracture caused by prying.

Furthermore, the wear-resistant flanged cylindrical sleeve is fitted on the outer periphery of the flanged torsion spring holder which is secured on the end portion of the valve shaft, the outer torsional coil spring is inserted over this cylindrical sleeve, receiving the inner diameter side through the entire length, and the annular collar installed over the outer periphery of the end portion of the cylindrical sleeve is received in the axial direction by the flange of the spring holder, and at the same time the outer-diameter portion of the annular collar is fitted at the positioning projection provided on the outer circumference of this flange and protruding axially inwardly, to determine the radial position, thereby preventing the outer torsion coil spring from biting into the cylindrical sleeve, reducing the eccentricity of the torsion coil spring, and protecting the cylinder sleeve from fracture caused by prying similarly as described above.

BRIEF DESCRIPTION OF THE DRAWINGS

FIG. 5 is a longitudinal sectional view of a first embodiment of an intake throttle valve return device of engine according to the present invention;

FIGS. 6A, 6B and 6C are front views showing major portions of a screw holder, an engaging member and a throttle valve lever in FIG. 5;

FIG. 11 is a longitudinal sectional view of a fourth embodiment according to the present invention; and FIGS. 12A, 12B and 12C are front view of major portions of the screw holder, the engaging member and the throttle valve lever of FIG. 11.

DETAILED DESCRIPTION OF THE PREFERRED EMBODIMENTS

Figure 1:
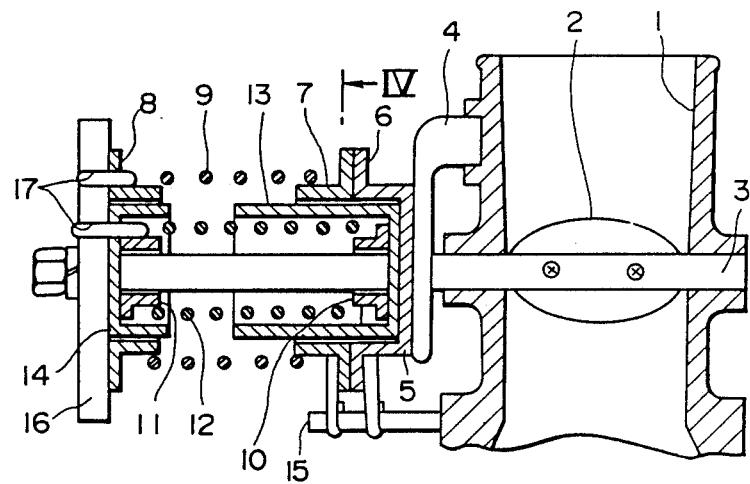
FIG. 1 is a longitudinal sectional view of a prior-art intake throttle valve return device.
Figure 2:
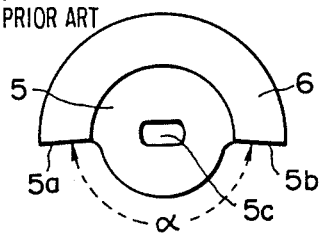
FIGS. 2 and 3 are plane and side views of a collar holder of FIG. 1.
Figure 3:
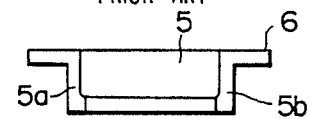
Figure 4:
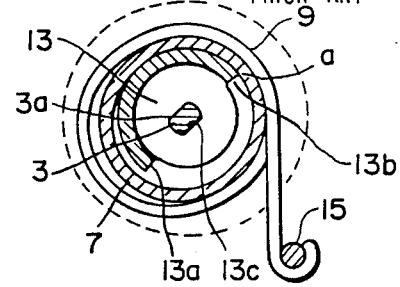
FIG. 4 is a sectional view taken along line IV—IV of FIG. 1.

Preferred embodiments of the intake throttle valve return device of engine in accordance with the present invention will now be described by referring to the accompanying drawings.

FIG. 5 is a longitudinal sectional view showing the first embodiment of the intake throttle valve return device of engine in accordance with the present invention. In FIG. 5, numeral 21 is a barrel, through which the air is taken in the direction of arrow. Numeral 22 is a valve shaft which is mounted in the barrel and rotatably supported on a pair of bearings 23, with the shaft end portion 22a extending outwardly. Numeral 24 is a throttle valve attached on the valve shaft 22; numerals 25, 26 are holding plates for holding the bearing 23; numeral 27 is a seal member; and numeral 28 is a spring retainer provided integral with, or secured to, the barrel 21.

Numerals 29, 30 are flanged cylindrical collars fitted on the shaft end portion 22a of the valve shaft 22, which are produced from a wear-resistant synthetic resin material. Numeral 31 is an inner torsion coil spring which is received by these cylindrical collars 29, 30, and one end of which is retained by the spring retainer 28. Numeral 32 is a spring holder comprising a cylindrical portion 32a, a bottom portion 32b at one end and a flange section 32c at the other end, being retained at the bottom portion 32b on the end portion of the valve shaft 22. Numeral 33 is a disc-shaped engaging member, on the outer periphery of which is provided a spring retaining portion 33a forming an engaging portion, which is fitted and locked on the end portion of the valve shaft 22. Numerals 34, 35 are flanged cylindrical collars produced from a wear-resistant synthetic resin material installed on the spring holder 32. Numeral 36 is an outer torsion coil spring received by these cylindrical collars 34, 35, with its one end being retained by the aforementioned spring retainer 28 and the other end being retained by the spring retaining portion 33a. Numeral 37 is a throttle valve lever mounted on the end portion of the valve shaft 22, and fixed together with the above-mentioned spring holder 32 and the engaging member 33 by a nut 39 through a spring washer 38. To this lever is connected a throttle wire from an accelerator pedal (both not illustrated) for opening and closing the throttle valve 24.

As shown in FIGS. 6A, 6B and 6C, the spring holder 32, engaging member 33 and the throttle valve lever 37 are provided with engaging through holes 32d, 33b and 37a respectively, in which the other end of the inner torsion coil spring 31 is fitted end locked. Furthermore, the spring holder 32, the engaging member 33 and the throttle valve lever 37 are provided with locking holes 32e, 33c and 37b, in which the end portion of the valve shaft 22 is inserted, being locked by the cutout locking section 22b such that it can rotate with the valve shaft 22 as a unit.

The aforementioned inner and outer torsion coil springs 31 and 36 are assembled in a twisted state such that the spring force will act toward closing the throttle valve 24. One end of the inner torsion coil spring 31 is led out through a clearance provided between the spring holder 32 and the barrel 21 side; and because there exists no part on the way, the spring can easily be attached on the spring retainer 28, thus allowing extremely easy assembly and connection of each part.

Figure 7:
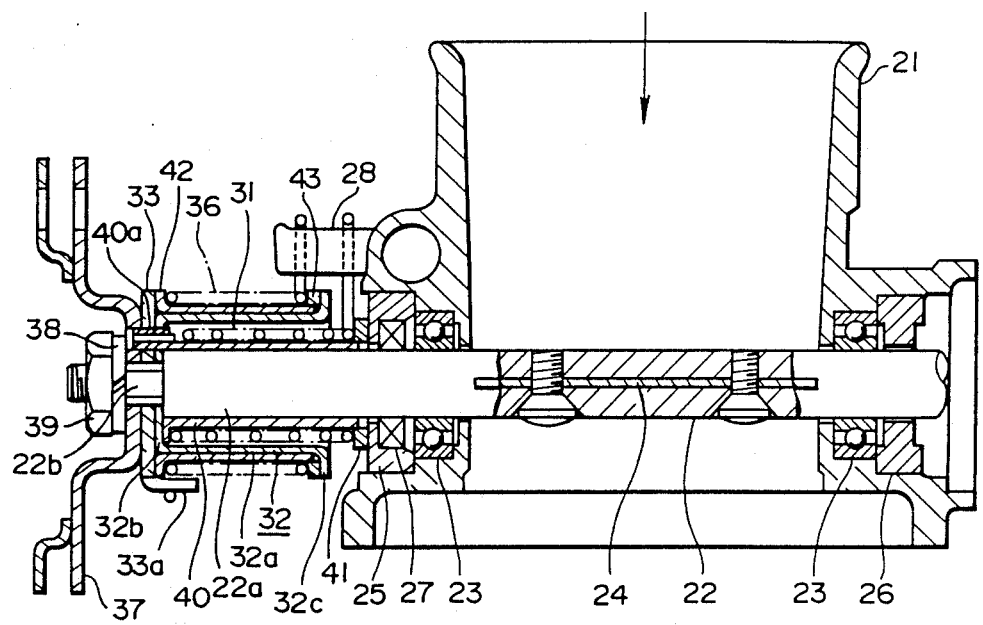
FIG. 7 is a longitudinal sectional view of a second embodiment of the present invention.
Figure 8:
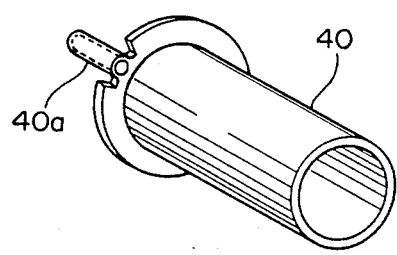
FIG. 8 is a perspective view of a cylindrical sleeve in the second embodiment.

FIG. 7 is a longitudinal sectional view showing the second embodiment in accordance with the present invention. In FIG. 7 in which the same numerals are used for the same parts as are shown in FIG. 5 described above, numeral 40 is a flanged cylindrical sleeve installed on the shaft end portion 22a of the valve shaft 22; it is produced from a wear-resistant synthetic resin material. This cylindrical sleeve 40, as shown in FIG. 8, has a tubular engaging projection 40a which axially protrudes from the flange section as a unit.

Numeral 41 is an annular collar produced from a wear-resistant synthetic resin material, which is fitted on the outer periphery of the end of the cylindrical sleeve 40 and retained by the retaining plate 23.

Numeral 42 is a flanged cylindrical sleeve produced from a wear-resistant synthetic resin material which is fitted on the spring holder 32. Numeral 43 is an annular collar produced from a wear-resistant synthetic resin material fitted on the outer periphery of the end portion of the cylindrical sleeve 42, being received by the flange section 32c of the spring holder 32. Numeral 36 is an outer torsion coil spring received by the cylindrical sleeve 34 and the annular collar 43, with its one end being retained by the above-described spring retainer 28 and the other end being retained by the spring retaining portion 33a.

The inner torsion coil spring 31 is inserted over the flanged cylindrical sleeve 40 and supported from the inside diameter side over the entire length; both ends in the axial direction are received by the flange of the cylindrical sleeve 40 and the annular collar 41, with one end being retained by the spring retainer 28, and the other end extending in the axial direction being engaged in the tubular engaging projection 40a of the cylindrical sleeve 40.

The outer torsion coil spring 36 is inserted over the flanged cylindrical sleeve 42, and received from inside diameter; both ends in the axial direction are received by the flange of the cylindrical sleeve 42 and the annular collar 43, with one end being retained by the spring retainer 28, and the other end being retained by the spring retaining portion 33a.

The spring holder 32, the engaging member 33, and the throttle valve lever 37 are provided with engaging through holes 32d, 33b and 37a, in which the tubular engaging projection 40a of the cylindrical sleeve 40 is inserted and locked. Furthermore, the spring holder 32, the engaging member 33, and the throttle valve lever 37, as described above, are retained to the cutout retaining portion 22b in the retaining holes 32e, 33c and 37b, rotating with the valve shaft 22 as a unit.

The above-mentioned spring holder 32 and the engaging member 33 are engaged with the tubular engaging projection 40a in the engaging holes 32d and 33b, positioned in the circumferential direction, being assembled with the inner and outer torsion coil springs 31, 36 twisted to a required angle and set to the cutout retaining portion 22b at the end portion of the valve shaft 24. The above-mentioned inner and outer torsion coil springs 31 and 36 are assembled in a twisted state such that the spring force will act toward closing the throttle valve 24.

Figure 9:
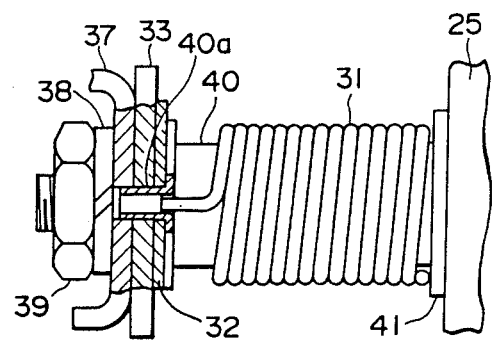
FIG. 9 is a front view, partly broken, of an engaging section of an inner torsion coil spring wound around the cylindrical sleeve.

Also, the other end of the inner torsion coil spring 31 that is extended straight in the axial direction, as shown in FIG. 9, has been preset to the length of the other end so as to be retained within the tubular engaging projection 29 even when the height of the spring is decreased to a minimum by an external force such as vibration, thus maintaining a reliable spring retaining performance.

Figure 10:
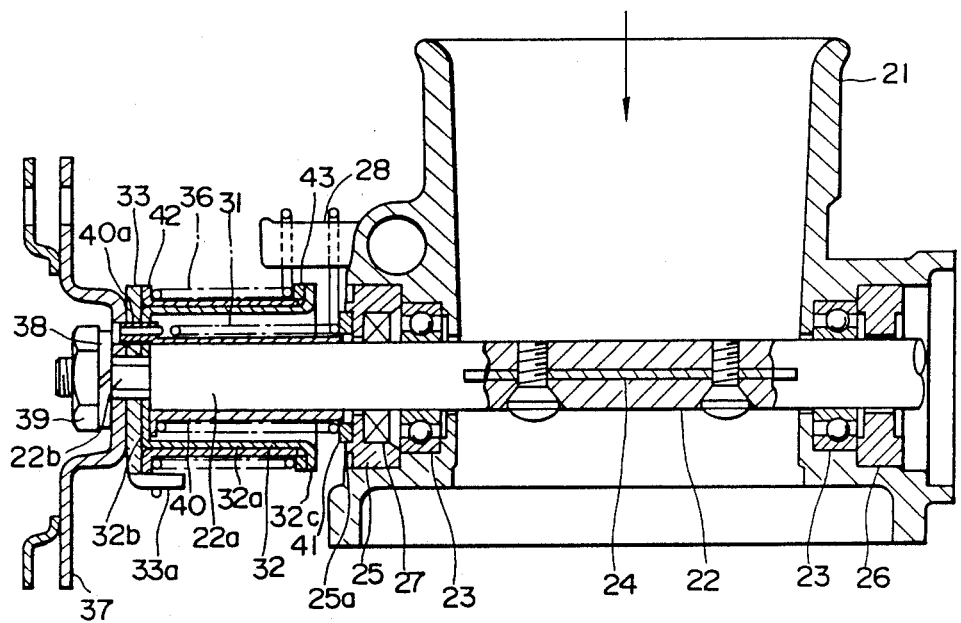
FIG. 10 is a longitudinal sectional view of a third embodiment according to the present invention.

FIG. 10 is a longitudinal sectional view showing a third embodiment of the present invention. In FIG. 10 in which the same numerals are used for the same parts as are shown in FIG. 7 described above, in the holding plate 25 is fitted the outside diameter section of the annular collar 41 for positioning in the diametral direction, that is, there is provided a positioning engaging portion 25a for positioning concentrically with the valve shaft 22. This positioning engaging portion is to be provided in the barrel 21 when the annular collar 41 is directly fitted in the barrel 21.

FIG. 11 is a longitudinal sectional view showing the fourth embodiment in accordance with the present invention. In FIG. 11 in which the same numerals are used for the same parts as are shown in FIG. 7 described above, the flange section 32c of the spring holder 32 is provided, as shown in FIG. 12C, with a plurality of positioning projections 32f axially inwardly in the outside-diameter section. With these positioning projections 32f are engaged, for positioning in the radial direction, the annular collar 43 which is fitted on the outer periphery of the end portion of the cylindrical sleeve 42 and received by the flange section 32c of the spring holder 32, thus positioning the cylindrical sleeve 43 concentrically with the valve shaft 22.

In the aforementioned embodiment, the spring holder 32 is provided with the positioning projections 32f at equal intervals at three places on the flange section 32c, but the projections may be increased, or arranged in an annular form.

What is claimed is:

1. An intake throttle valve return device of engine, comprising: a throttle valve disposed within a barrel of engine; a valve shaft supported in a diametral direction through said barrel, on which said throttle valve is secured, with at least one end side thereof extending outwardly as a shaft end portion; an inner torsion coil spring and an outer torsion coil spring which are disposed concentrically with said shaft end portion, and each end being retained by a spring retainer of said barrel; a spring holder having a flange section on the outer periphery of other end of a bottomed cylindrical part, said cylindrical part being positioned between said both torsion coil springs, with a clearance provided between said other end and said barrel where one end of said inner tension coil spring passes to be retained, at said bottom portion, by the end portion of said valve shaft, and said flange section holding said outer torsion coil spring from disengaging in the axial direction; and an engaging member, which is secured at bottom with said spring holder at the end portion of said valve shaft, and retains each other end of said inner torsion coil spring and said outer torsion coil spring.

2. An intake throttle valve return device of engine as claimed in claim 1, wherein said engaging member is of a disc shape and provided with a spring retaining section on the outer periphery.

3. An intake throttle valve return device of engine as claimed in claim 1, wherein said inner torsion coil spring is received by a flanged cylindrical collar fitted on the shaft end portion of said valve shaft, and said outer torsion coil spring is received by a flanged cylindrical collar fitted on said spring holder.

4. An intake throttle valve return device of engine as claimed in claim 3, wherein said flanged cylindrical collar is produced from a wear-resistant synthetic resin material.

5. An intake throttle valve return device of engine as claimed in claim 1, further comprising: a flanged cylindrical sleeve which has an axially protruding tubular engaging projection formed integral with the flange portion, and is fitted on the shaft end portion of said valve shaft, said tubular engaging projections being engaged with the other end of said inner torsion coil spring inserted inside and engaged in each engaging hole of said spring holder and said engaging member.

6. An intake throttle valve return device of engine as claimed in claim 5, wherein said flanged cylindrical sleeve is produced from a wear-resistant synthetic resin material.

7. An intake throttle valve return device of engine as claimed in claim 5, wherein said inner torsion coil spring inserted into said tubular engaging projection remains in the engaged state within said tubular engaging projection if the length of the other end of said spring is contracted to a minimum height by an external force.

8. An intake throttle valve return device of engine as claimed in claim 5, further having an annular collar which is fitted on the outer periphery of said flanged cylindrical sleeve, received in the axial direction on the barrel side, and positioned in the diametrical direction by engaging at the outer-diameter section with the positioning engaging portion on said barrel side.

9. An intake throttle valve return device of engine as claimed in claim 8, wherein said annular collar is produced from a wear-resistant synthetic resin material.

10. An intake throttle valve return device of engine as claimed in claim 1, wherein positioning projections protruding axially inwardly are provided on the flange section of said spring holder, fitted on the outer periphery of a flanged cylindrical sleeve mounted on the outer periphery of said spring holder, and provided with an annular collar which is engaged at the outer-diameter section with said positioning projections for positioning in the diametrical direction, so that both ends in the axial direction of said outer torsion coil spring fitted over said flanged cylindrical sleeve are received by the flange of said flanged cylindrical sleeve and said annular collar.

* * * * *